(12) United States Patent
Hetrick et al.

(10) Patent No.: US 7,430,635 B2
(45) Date of Patent: Sep. 30, 2008

(54) METHODS AND STRUCTURE FOR IMPROVED IMPORT/EXPORT OF RAID LEVEL 6 VOLUMES

(75) Inventors: William A. Hetrick, Wichita, KS (US); Charles E. Nichols, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 359 days.

(21) Appl. No.: 11/192,544

(22) Filed: Jul. 30, 2005

(65) Prior Publication Data

US 2007/0028042 A1 Feb. 1, 2007

(51) Int. Cl.
*G06F 12/16* (2006.01)
(52) U.S. Cl. ..................................... 711/114; 711/170
(58) Field of Classification Search ........................ None
See application file for complete search history.

(56) References Cited

U.S. PATENT DOCUMENTS

| | | | |
|---|---|---|---|
| 6,275,898 B1 * | 8/2001 | DeKoning | 711/114 |
| 6,516,425 B1 * | 2/2003 | Belhadj et al. | 714/6 |
| 6,530,004 B1 * | 3/2003 | King et al. | 711/165 |
| 6,996,689 B2 * | 2/2006 | Chatterjee et al. | 711/162 |
| 7,058,762 B2 * | 6/2006 | Patterson et al. | 711/114 |
| 7,237,062 B2 * | 6/2007 | Lubbers et al. | 711/114 |
| 2004/0210731 A1 * | 10/2004 | Chatterjee et al. | 711/165 |
| 2004/0250017 A1 * | 12/2004 | Patterson et al. | 711/114 |
| 2005/0182992 A1 * | 8/2005 | Land et al. | 714/701 |
| 2006/0015697 A1 * | 1/2006 | Morishita et al. | 711/162 |
| 2006/0288176 A1 * | 12/2006 | Morishita et al. | 711/161 |

* cited by examiner

*Primary Examiner*—Kevin Verbrugge
(74) *Attorney, Agent, or Firm*—Duft Bornsen & Fishman, LLP

(57) ABSTRACT

Methods and structure for improved import/export of RAID level 6 logical volumes in subsystems supporting RAID level 5 but not level 6. When a RAID level 6 logical volume is imported into a RAID level 5 storage subsystem, features and aspects hereof re-map the logical volume for use as a RAID level 5 logical volume. Disk blocks containing the level 6 additional redundancy information are not used by the RAID level 5 storage subsystem but are skipped in the re-mapping of the logical volume. All other blocks of the logical volume are mapped to corresponding blocks of the RAID level 6 mapping of the logical volume. The logical volume may then be flagged to indicate the additional redundancy information is invalid. A RAID level 6 storage subsystem may then rebuild the additional redundancy information when the flagged logical volume is re-imported to a RAID level 6 storage subsystem.

14 Claims, 8 Drawing Sheets

METHODS AND STRUCTURE FOR IMPROVED IMPORT/EXPORT OF RAID LEVEL 6 VOLUMES

BACKGROUND OF THE INVENTION

1. Field of the Invention

The invention relates to import and export of RAID logical volumes and in particular relates to importation of a RAID level 6 volume into a subsystem that does not support RAID level 6 and re-importation of such a volume back to a RAID level 6 subsystem.

2. Discussion of Related Art

Storage subsystems have evolved along with associated computing subsystems to improve performance, capacity, and reliability. Redundant arrays of independent disks (so called "RAID" subsystems) provide improved performance by utilizing striping features and provide enhanced reliability by adding redundancy information.

Performance is enhanced by utilization of so called "striping" features in which one host request for reading or writing is distributed over multiple simultaneously active disk drives to thereby spread or distribute the elapsed time waiting for completion over multiple, simultaneously operable disk drives. Redundancy is accomplished in RAID subsystems by adding redundancy information such that the loss/failure of a single disk drive of the plurality of disk drives on which the host data and redundancy information are written will not cause loss of data. Despite the loss of a single disk drive, no data will be lost though in some instances the logical volume will operate in a degraded performance mode.

RAID storage management techniques are known to those skilled in the art by a RAID management level number. The various RAID management techniques are generally referred to as "RAID levels" and have historically been identified by a level number. RAID level 5, for example, utilizes exclusive-OR ("XOR") parity generation and checking for such redundancy information. Whenever data is to be written to the storage subsystem, the data is "striped" or distributed over a plurality of simultaneously operable disk drives. In addition, XOR parity data (redundancy information) is generated and recorded in conjunction with the host system supplied data. In like manner, as data is read from the disk drives, striped information may be read from multiple, simultaneously operable disk drives to thereby reduce the elapsed time overhead required completing a given read request. Still further, if a single drive of the multiple independent disk drives fails, the redundancy information is utilized to continue operation of the associated logical volume containing the failed disk drive. Read operations may be completed by using remaining operable disk drives of the logical volume and computing the exclusive-OR of all blocks of a stripe that remain available to thereby re-generate the missing or lost information from the inoperable disk drive. Such RAID level 5 storage management techniques for striping and XOR parity generation and checking are well known to those of ordinary skill in the art.

RAID level 6 builds upon the structure of RAID level 5 but adds a second block of redundancy information to each stripe. The additional redundancy information is based exclusively on the data block portions of a given stripe and does not include the parity block computed in accordance with typical RAID level 5 storage management. Thus, the additional redundancy block for each stripe produces redundancy information orthogonal to the parity data redundancy information used in RAID level 5. Typically, the additional redundancy block generated and checked in RAID level 6 storage management is orthogonal to the parity generated and checked in accordance with RAID level 5 standards.

In modern storage subsystems, disk drives are often integrated within an enclosure or box with little to no processing capabilities associated therewith. Such a box is often referred to as "just a box of disks" or "JBOD". Whether configured as such a box or as individual disk drives devoid of such a common enclosure, it is common for large computing enterprises to move individual disk drives or multiple disk drives from one storage subsystem to another storage subsystem. Such movement may be for purposes of load balancing, security or other reasons unique to the computing enterprise. Such physical movement of disk drives or modules or boxes of disk drives is referred to herein as "drive migration" or "physical migration" and refers to the physical act of removing a disk drive or multiple disk drives from one storage subsystem and inserting them into another storage subsystem.

It is common in such storage subsystems to logically define one or more logical volumes such that each logical volume comprises some portion of the entire capacity of the storage subsystem. Each volume may be defined to span a portion of each of one or more disk drives in the storage subsystem. Multiple such logical volumes may be defined within the storage subsystem typically under the control of a storage subsystem controller. Therefore, for any group of disk drives comprising one or more disk drives, one or more logical volumes or portions thereof made physically reside on the particular subset of disk drives. It is common for a storage subsystem controller component (i.e., a RAID storage controller) to record configuration information about the known logical volumes on each disk drive in the storage subsystem. The configuration information ("configuration database") records maintain information regarding which disk drives are used to form a portion of each logical volume. The storage controller updates such configuration information from time to time (i.e., as the configuration is changed) and may associate a version number, time stamp, or other indicia to indicate the validity of the configuration database.

Typically, before a subset of disk drives is physically migrated from a first storage subsystem to a second storage subsystem, all logical volumes associated with the disk drive to be migrated are disabled or otherwise made inaccessible to users of the first storage subsystem from which the disk drive are to be migrated. When a second storage subsystem first senses a new disk drive being inserted into its control, the configuration information contained on the inserted disk drive is read by the second storage subsystem (i.e., the destination of the disk drive migration) and logical volumes defined in that configuration database are merged with the definitions of logical volumes already known to the receiving second storage subsystem. When all disk drives required for any particular logical volume newly defined to the receiving second storage subsystem are finally inserted, that logical volume may be made available to users of the second storage subsystem. Often an administrative user may be asked whether he/she desires the newly defined logical volume to be "imported" into the new receiving storage subsystem to thereby make it available for use in the receiving second storage subsystem.

A problem may arise where a RAID level 6 logical volume is exported from the first storage subsystem and imported to a second storage subsystem that does not adequately support RAID level 6 storage management techniques. Most present-day storage subsystems utilize hardware assist circuitry to maintain desired performance levels for any given RAID storage management level. In other words, a first storage subsystem may include hardware assist circuitry for improving the performance of both RAID levels 5 and 6 while the second storage subsystem (e.g., an older "legacy" subsystem) may include hardware support only capable of adequately performing RAID level 5 storage management techniques.

To resolve the problem of a RAID level 6 logical volume being received for import within a storage subsystem supporting only RAID level 5, three generic options have generally been proposed in the past. First, though the logical volume is recognized by the receiving storage subsystem, the storage controller therein may disallow a user from importing the newly defined logical volume into its control. The newly defined logical volume will simply remain unavailable to the second, receiving storage subsystem. A second prior solution involves allowing the importation of the newly discovered RAID level 6 volume but indicating that the volume is incompatible with capabilities of the receiving, second storage subsystem. In these first two options, integrity of the information stored in the newly discovered logical volume is maintained in that no user may be allowed access to the RAID level 6 logical volume.

A third general approach known in the art is to permit importation of the newly defined logical volume and to emulate the RAID level 6 storage management techniques utilizing software features rather than hardware assist circuits that may have been available to the exporting first storage subsystem. In general, this third approach of emulating RAID level 6 management utilizing software techniques within the second subsystem's storage controller provides prohibitively poor performance.

It is evident from the above discussion that a need exists for improved methods and systems for improved importation and exportation between RAID level 6 and RAID level 5 storage subsystems.

SUMMARY OF THE INVENTION

The present invention solves the above and other problems, thereby advancing the state of the useful arts, by providing methods and associated systems to permit importation of a RAID level 6 logical volume into a storage subsystem adapted with hardware assist circuits to adequately support RAID level 5 but not to adequately support RAID level 6. More specifically, features and aspects hereof provide flexible mapping of the blocks of a newly discovered RAID level 6 logical volume to manage the volume as a RAID level 5 volume with additional blocks containing the RAID level 6 second redundancy information. The additional redundancy information utilized only by RAID level 6 is ignored and left untouched while the logical volume is accessible within the RAID level 5 storage subsystem.

In another feature and aspect hereof, the RAID level 6 logical volume is flagged by the receiving subsystem to indicate that the RAID level 6 additional redundancy information is out of date. So flagging the logical volume to indicate that the additional redundancy information utilized in RAID level 6 is no longer up to date, the storage controller of a RAID level 6 storage management subsystem may then rebuild the RAID level 6 additional redundancy information when the logical volume is eventually imported back into a RAID level 6 storage subsystem. Still another feature and aspect hereof detects when such a flagged logical volume is being re-imported into a RAID level 6 storage management subsystem from a RAID level 5 storage management subsystem. When sensing importation of such a flagged RAID level 6 logical volume, the additional redundancy information associated with RAID level 6 as compared to RAID level 5 will be out of date and may be regenerated or rebuilt by the RAID level 6 storage management subsystem. During such a rebuild operation of the RAID level 6 additional redundancy information, the storage subsystem may continue utilizing the re-imported logical volume as a RAID level 5 logical volume.

A first feature hereof provides a method associated with RAID storage subsystems including a first subsystem that includes hardware support for RAID level 6 storage management and including a second subsystem that does not include hardware support for RAID level 6 storage management, the method comprising: operating an imported RAID level 6 logical volume in the second storage subsystem as a RAID level 5 logical volume; and flagging the imported RAID level 6 logical volume by operation of the second subsystem to indicate that the additional redundancy information associated with the imported RAID level 6 logical volume is invalid.

Another aspects hereof further provides for importing the RAID level 6 logical volume into the second storage subsystem prior to the step of operating; and exporting the RAID level 6 logical volume from the second storage subsystem following the steps of operating and flagging.

Another aspects hereof further provides for importing the RAID level 6 logical volume into the first subsystem; detecting in the first subsystem that the RAID level 6 logical volume has been flagged; and re-building the additional redundancy information by operation of the first subsystem; and resetting the flagging of the RAID level 6 logical volume within the first subsystem upon completion of the re-building.

Another aspects hereof further provides for operating the RAID level 6 logical volume as a RAID level 5 logical volume until completion of the step of re-building.

Another aspects hereof further provides that the step of operating further comprises: mapping a RAID level 5 logical volume on the imported RAID level 6 logical volume such that disk blocks containing the additional redundancy information associated with the RAID level 6 logical volume are skipped and all other disk blocks of the RAID level 5 logical volume map to corresponding disk blocks of the RAID level 6 logical volume.

Another feature hereof provides a system comprising: a storage subsystem having a storage controller that supports RAID level 5 storage management, the storage controller including: an importer for importing a RAID level 6 logical volume for use as a RAID level 5 logical volume, wherein the storage controller is adapted to use the imported RAID level 6 logical volume by accessing it as a RAID level 5 logical volume, and wherein the storage controller is adapted to flag the logical volume to indicate that the additional redundancy information associated with the imported RAID level 6 logical volume is invalid.

Another aspects hereof further provides for a second storage subsystem having a second storage controller that supports RAID level 6 storage management, the second storage controller including: a second importer for importing the flagged RAID level 6 logical volume that has invalid additional redundancy information; and a rebuilder for rebuilding the invalid additional redundancy information.

Another aspects hereof further provides that the second storage controller is adapted to process requests to the RAID level 6 logical volume by accessing the RAID level 5 logical volume until the rebuilder has completed rebuilding the invalid additional redundancy information.

Another aspects hereof further provides that the importer further comprises: a re-mapper to map the RAID level 5 logical volume to the RAID level 6 logical volume such that the disk blocks containing the additional redundancy information are skipped and such that all other disk blocks of the RAID level 5 logical volume align with corresponding disk blocks of the RAID level 6 logical volume.

Another feature hereof provides a system including: a first storage subsystem that includes hardware support for RAID level 6 storage management; and a second storage subsystem that does not include hardware support for RAID level 6 storage management, wherein the second storage subsystem further comprises: means for operating an imported RAID level 6 logical volume as a RAID level 5 logical volume; and means for flagging the imported RAID level 6 logical volume to indicate that the additional redundancy information associated with the imported RAID level 6 logical volume is invalid.

Another aspects hereof further provides that the second storage subsystem further comprises: means for importing the RAID level 6 logical volume operable prior to operation of the means for operating; and means for exporting the RAID level 6 logical volume from the second storage subsystem following operation of the means for operating and the means for flagging.

Another aspects hereof further provides that the first storage subsystem further comprises: means for importing the RAID level 6 logical volume; means for detecting that the RAID level 6 logical volume has been flagged; and means for re-building the additional redundancy information; and means for resetting the flag of the RAID level 6 logical volume following completion of the re-building.

Another aspects hereof further provides that the first storage subsystem further comprises: means for operating the RAID level 6 logical volume as a RAID level 5 logical volume until completion of the re-building.

Another aspects hereof further provides that the means for operating further comprises: means for mapping a RAID level 5 logical volume on the imported RAID level 6 logical volume such that disk blocks containing the additional redundancy information associated with the RAID level 6 logical volume are skipped and all other disk blocks of the RAID level 5 logical volume map to corresponding disk blocks of the RAID level 6 logical volume.

DETAILED DESCRIPTION OF THE DRAWINGS

Figure 1:
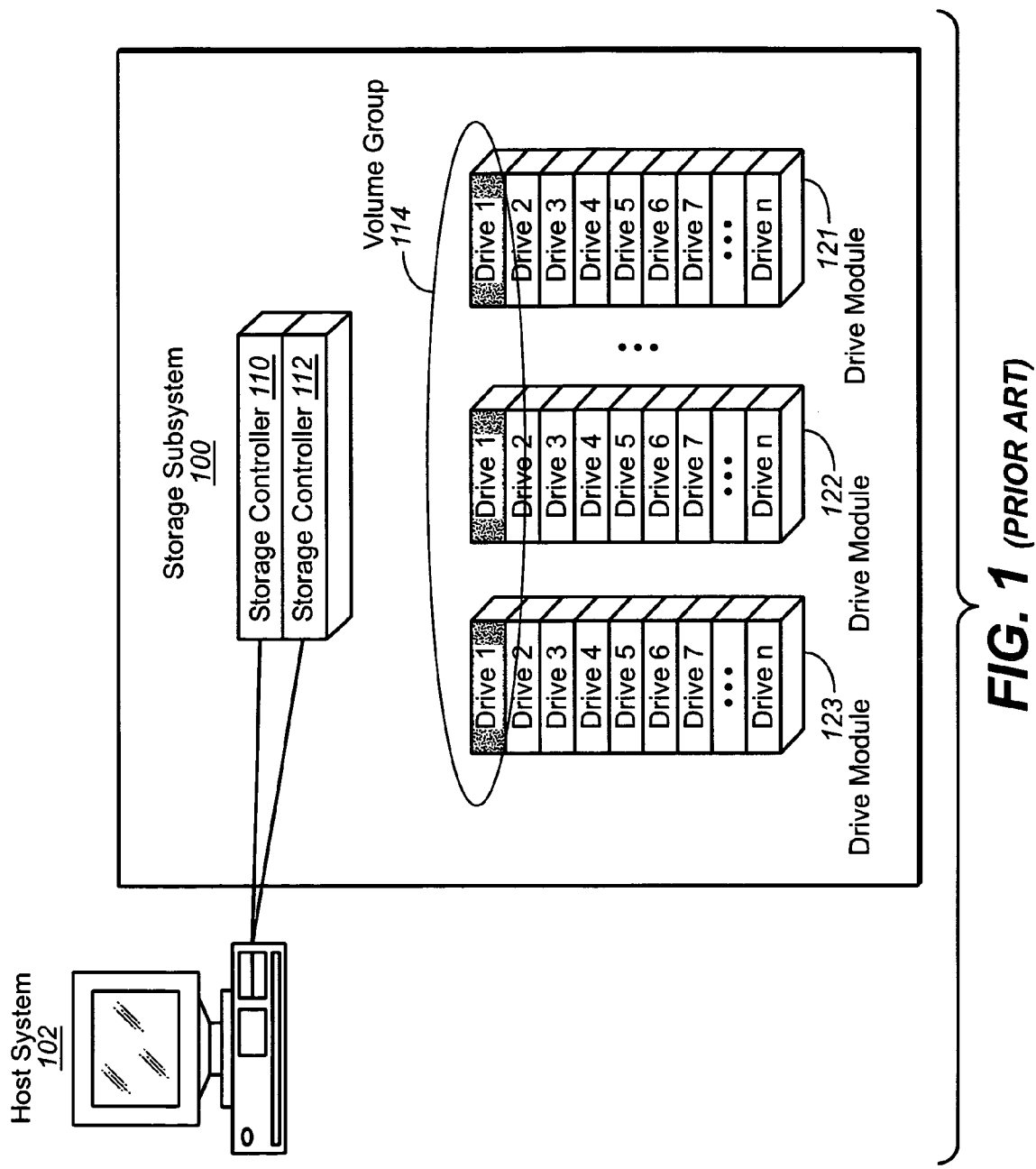
FIG. 1 is a block diagram of a typical storage subsystem as generally known in the art.

FIG. 1 is a block diagram of a storage subsystem 100 coupled to a host system 102 for processing I/O requests. As generally known in the art, such a storage subsystem 100 may include one or more storage controllers 110 and 112 each coupled to the one or more host systems 102. Further, a plurality of disk drives, organized individual disk drives or as modules of disk drives, may be provided within such a storage subsystem. As shown in FIG. 1, drive module 121 may include drives 1 through n, drive module 122 may also include its own drives also identified therein as drives 1 through n and drive module 123 may also include its own drives 1 through n. A volume group 114 may comprise portions of one or more disk drives of one or more drive modules. The volume group 114 may therefore include portions of one or more logical volumes.

As is generally known in the art, any number of such drive modules, each including any number of disk drives, may be provided in such a storage subsystem 100. Further, as generally known in the art, each drive module 112 may comprise individual disk drives or may be disk drives incorporated within a common enclosure supplying power, cooling, and interface features. Storage controllers 110 and 112 are generally coupled to the drive modules 121 through 123 (and hence to the individual disk drives) by any of several well-known interconnection protocols and media including, for example, high speed serial attachment, fiber optic serial attachment, parallel bus attachment (such as parallel SCSI), etc. Further, those of ordinary skill in the art will recognize that any number of such volume groups 114 may be defined within a storage subsystem 100 and may comprise any portion of any of the disk drives of any of the drive modules. Logical configuration and mapping features to define such volume groups are well known to those of ordinary skill in the art.

Figure 2:
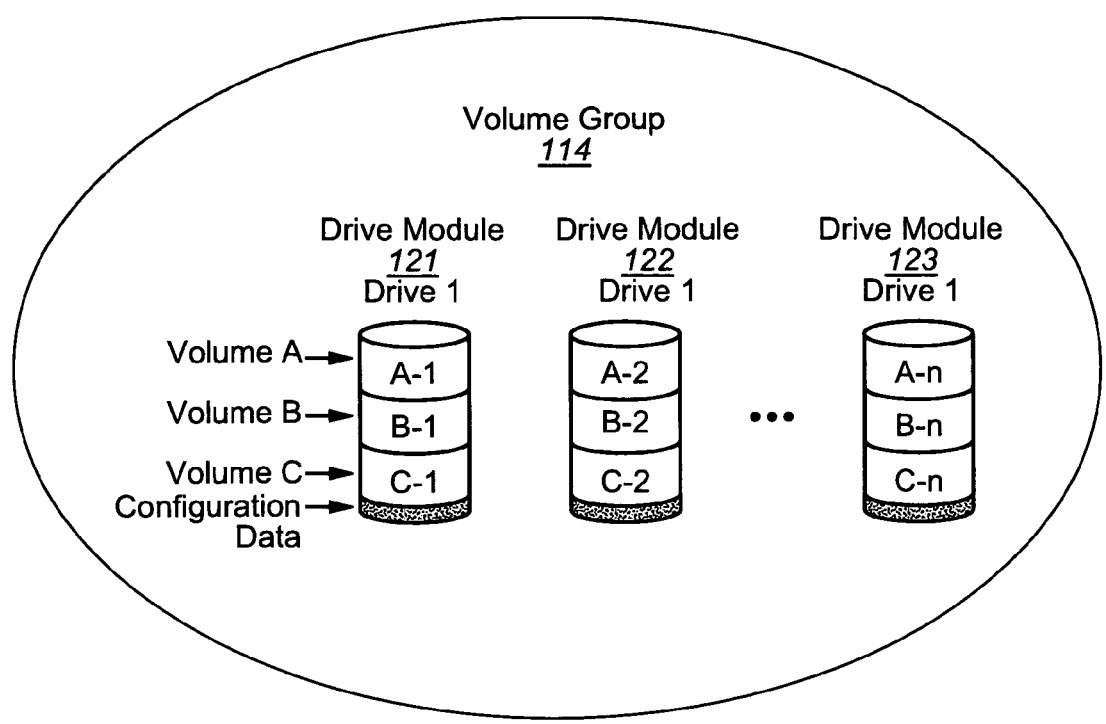
FIG. 2 shows additional details of a volume group of FIG. 1 as generally known in the art.

FIG. 2 is a block diagram providing additional details of an exemplary volume group 114 shown in FIG. 1. As noted above, volume group 114 may comprise any portion of any disk drives of any of the drive modules. For example, as shown in FIG. 2, exemplary volume group 114 comprises a portion (the entirety) of disk drives 1 in each of drive modules 121, 122, and 123. Those of ordinary skill in the art will readily recognize that any number of disk drives or even portions of disk drives may be included within such a volume group 114. Further, those of ordinary skill in the art will readily recognize that any number of drive modules may form a part of a defined volume group 114.

As shown, a volume group 114 comprising any number of disk drives or portions thereof distributed over any number of drive modules may comprise plurality one or more logical volumes shown in FIG. 2 as volumes A, B, and C. In particular, as shown in FIG. 2, volume A of volume group 114 comprises portions of three disk drives as indicated. Specifically, logical volume A comprises a portion of drive 1 of drive module 121, a portion of drive 1 of drive module 122, and a portion of drive 1 of drive model 123. In like manner, volume B comprises corresponding portions of drive 1 of each of drive modules 121 through 123. Volume C likewise comprises portions of each of disk drive 1 of each of the drive modules 121 through 123.

As further noted above, it is common for storage controllers in such a storage subsystem to create a configuration database (e.g., "configuration data" or "configuration information") and to write the configuration database on a reserved portion of each disk drive of each drive module. Thus, the configuration of logical volumes A, B, and C will be readily a available to any host system that first senses importation or insertion of a disk drive from a logical volume in a corresponding volume group 114.

When volume group 114 is migrated from the first storage subsystem to a second storage subsystem, the second storage subsystem may obtain information about the configuration of each of logical volumes A, B, and C from the configuration database provided on any of the disk drives associated with the volume group.

Figure 3:
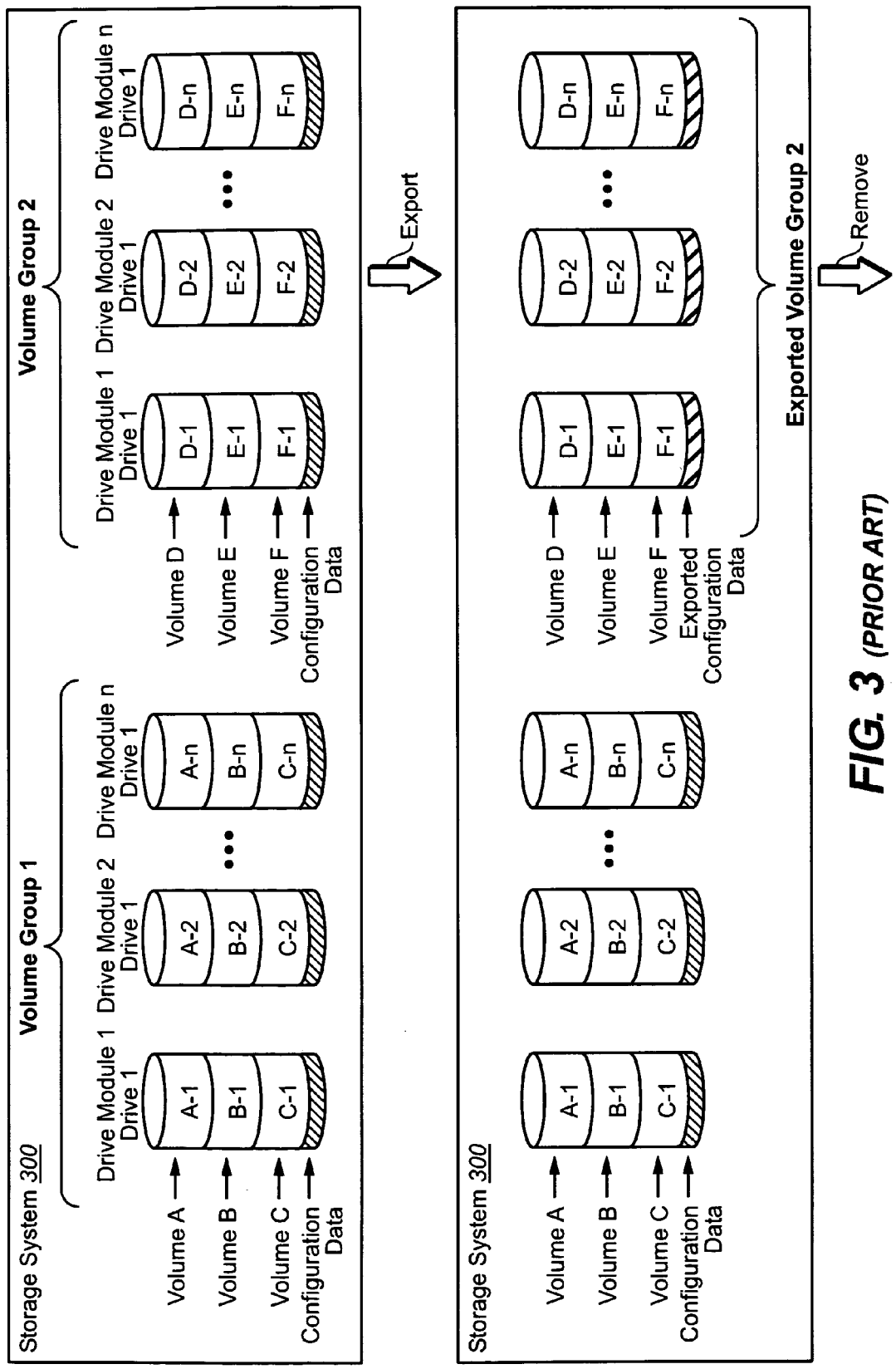
FIG. 3 is a diagram describing exportation to migrate a logical volume from a storage subsystem as generally known in the art.

FIG. 3 shows an exemplary process of preparing a volume group in a storage subsystem for exportation from a first system to migrate to another storage subsystem. In FIG. 3, storage subsystem 300 is shown atop FIG. 3 in a state before exportation of an identified volume group and at the bottom of FIG. 3 after exporting the identified volume group. As shown in FIG. 3 storage subsystem 300 includes six logical volumes (volume A through volume F). In accordance with the needs of the particular application, volume group 2 of storage subsystem 300 has been selected by the administrative user to be prepared for exportation and removal from the storage subsystem 300. Configuration data on each of the identified drive modules associated with the volume group to is therefore updated to indicate that the logical volume has been made unavailable (e.g., volume group 2 having been selected for exportation will be reconfigured by adjusting the configuration data to indicate that the volume group 2 is now exported and ready for removal). Once so prepared for exportation, volume group 2 may be physically removed from storage subsystem 300 to be inserted in another storage subsystem.

Figure 4:
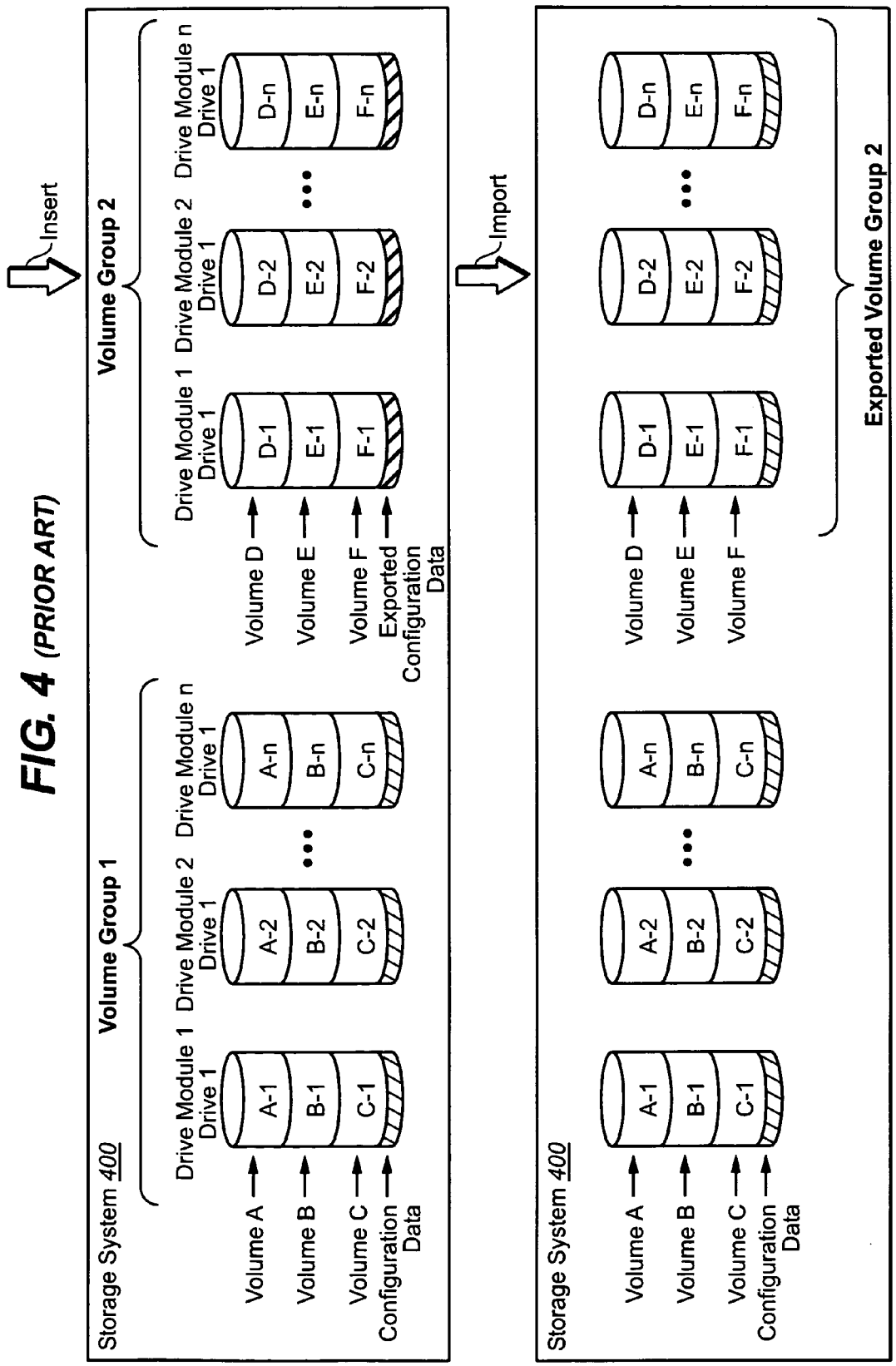
FIG. 4 is a diagram describing importation to migrate a logical volume to a storage subsystem as generally known in the art.

FIG. 4 shows a related block diagram where a previously exported and removed volume group may be imported into a second storage subsystem 400. As shown in FIG. 4, volume group 2 is detected as newly inserted in the storage subsystem 400. Upon sensing the insertion of at least one disk drive of volume group 2, the exported configuration data may be inspected to determine whether any logical volumes on the inserted volume group may be utilized in this second storage subsystem 400.

As noted above, prior art techniques allow importation of a RAID logical volume utilizing the same level of RAID storage management. However, as noted above, it has been an ongoing problem to allow importation of a RAID level 6 logical volume into a storage subsystem that does not effectively support RAID level 5. As noted above, RAID level 6 provides similar functionality to that of RAID level 5 storage management but adds orthogonal, additional redundancy information to further enhance reliability of the storage subsystem.

Figure 5:
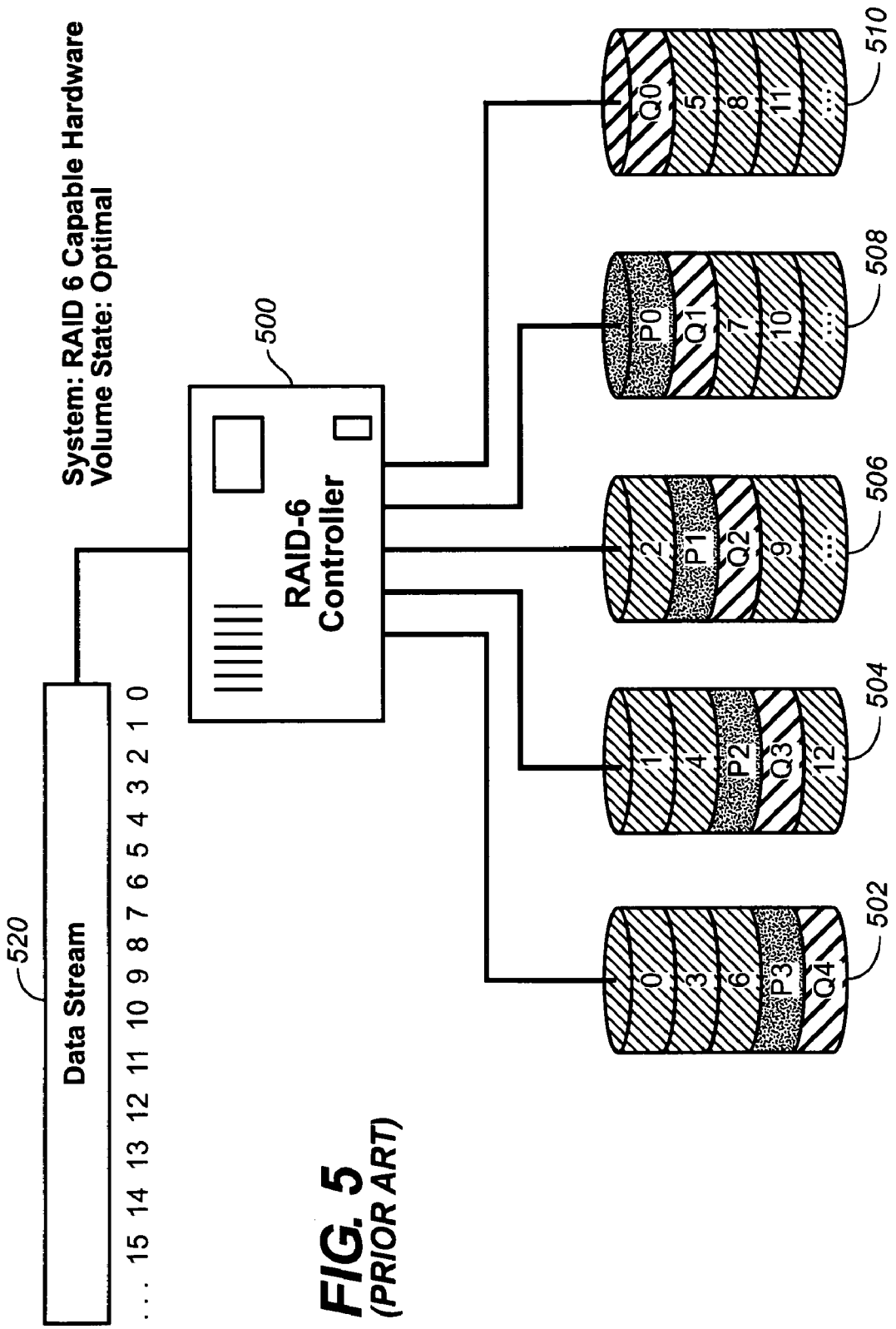
FIG. 5 is a diagram describing typical mapping of blocks in a RAID level 6 storage subsystem as generally known in the art.

FIG. 5 shows a typical data stream 520 comprising a plurality of logical blocks represented by logical block numbers 0 through 15, etc. RAID level 6 ("RAID-6") storage controller 500 receives the logical blocks to be written to the disk drives as a sequence of logical blocks numbered zero through fifteen. The storage controller 500 adapted for processing RAID-6 storage management then distributes or stripes the various blocks over the plurality of simultaneously operable disk drives 502 through 510. Each stripe comprises a plurality of logical blocks plus an associated parity block and an associated additional redundancy information block in accordance with RAID-6 storage management standards. For example, a first stripe shown in FIG. 5 comprises logical block 0 on disk drive 502, logical block 1 on disk drive 504, logical block 2 on disk drive 506, parity block P0 on disk drive 508, and additional redundancy block Q0 on disk drive 510. In like manner a second stripe comprises logical blocks 3, 4, and 5 on disk drives 502, 504, and 510, respectively plus redundancy blocks P1 and Q1 on disk drives 506 and 508, respectively. A third stripe comprises logical blocks 6, 7, and 8 and redundancy information blocks P2 and Q2 on disk drives 502, 508, 510, 504, and 506, respectively. In similar manner, a fourth and fifth stripe are depicted in FIG. 5 as distributed over the disk drives. Those of ordinary skill in the art will readily recognize the typical mapping of logical blocks to multiple disk drives in a striped, RAID-6 logical volume configuration.

Figure 6:
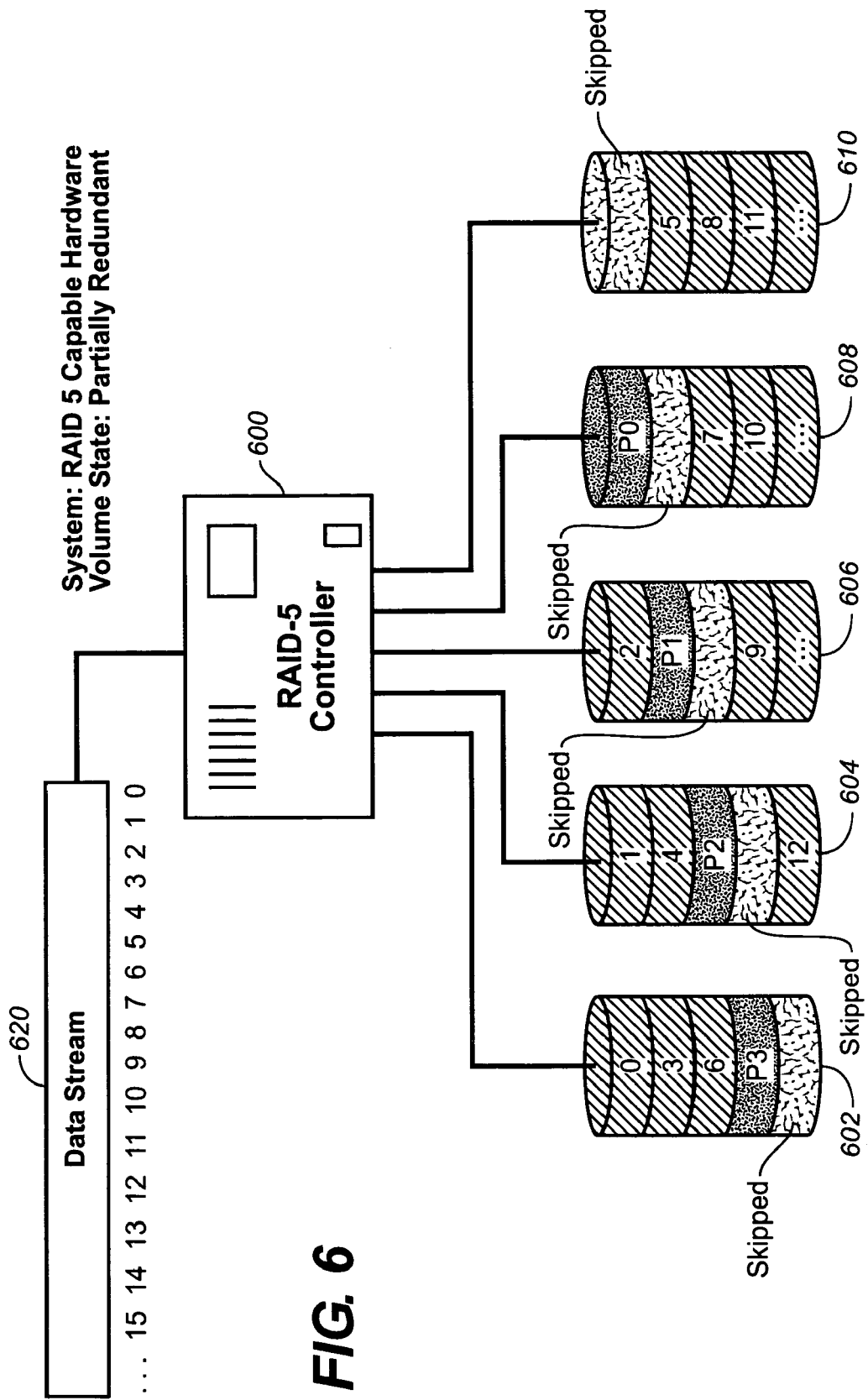
FIG. 6 is a diagram depicting an exemplary re-mapping of a RAID level 6 logical volume for use in a RAID level 5 storage subsystem in accordance with features and aspects hereof.

FIG. 6 is a block diagram showing storage controller 600 adapted for effective RAID level 5 ("RAID-5") storage management but not capable of effectively performing RAID-6 storage management. For example, storage controller 600 may be devoid of hardware assist circuits for computing the additional redundancy controller 600 may be fully capable of adequately performing RAID-5 storage management.

Storage controller 600 receives a data stream comprising a sequence of logical blocks supplied by a host system. The blocks may be identified by a logical block address or number indicated as block numbers zero through fifteen. Storage controller 600 then distributes or stripes the supplied information over the plurality of disk drives 602 through 610. In particular in accordance with features and aspects hereof, storage controller 600 is adapted to re-map the logical blocks associated with disk drives 602 through 610 such that the logical volume may be managed as a RAID-5 logical volume rather than a RAID-6 logical volume as it was originally configured. More specifically, the logical blocks and associated RAID-5 parity blocks are mapped to the same physical locations as those same blocks are mapped under a RAID-6 storage management technique. However, the additional redundancy information blocks associated only with RAID-6 storage management of the logical volume are identified as skipped or unused blocks in the re-mapped logical volume.

A first stripe shown in FIG. 6 therefore comprises logical blocks 0, 1, and 2 on disk drives 602, 604, and 606, respectively, parity block P0 on disk drive 608, and the skipped or unused logical block on disk drive 610. In like manner, a second stripe includes a skipped block on disk drive 608 while a third, fourth, and fifth stripe include skipped blocks on disk drives 606, 604, and 602, respectively. By so re-mapping the RAID-6 logical volume into a corresponding RAID-5 logical volume, the logical volume may be utilized in the storage subsystem having a RAID-5 storage controller 600 though the storage controller does not effectively support RAID-6. storage management.

Figure 7:
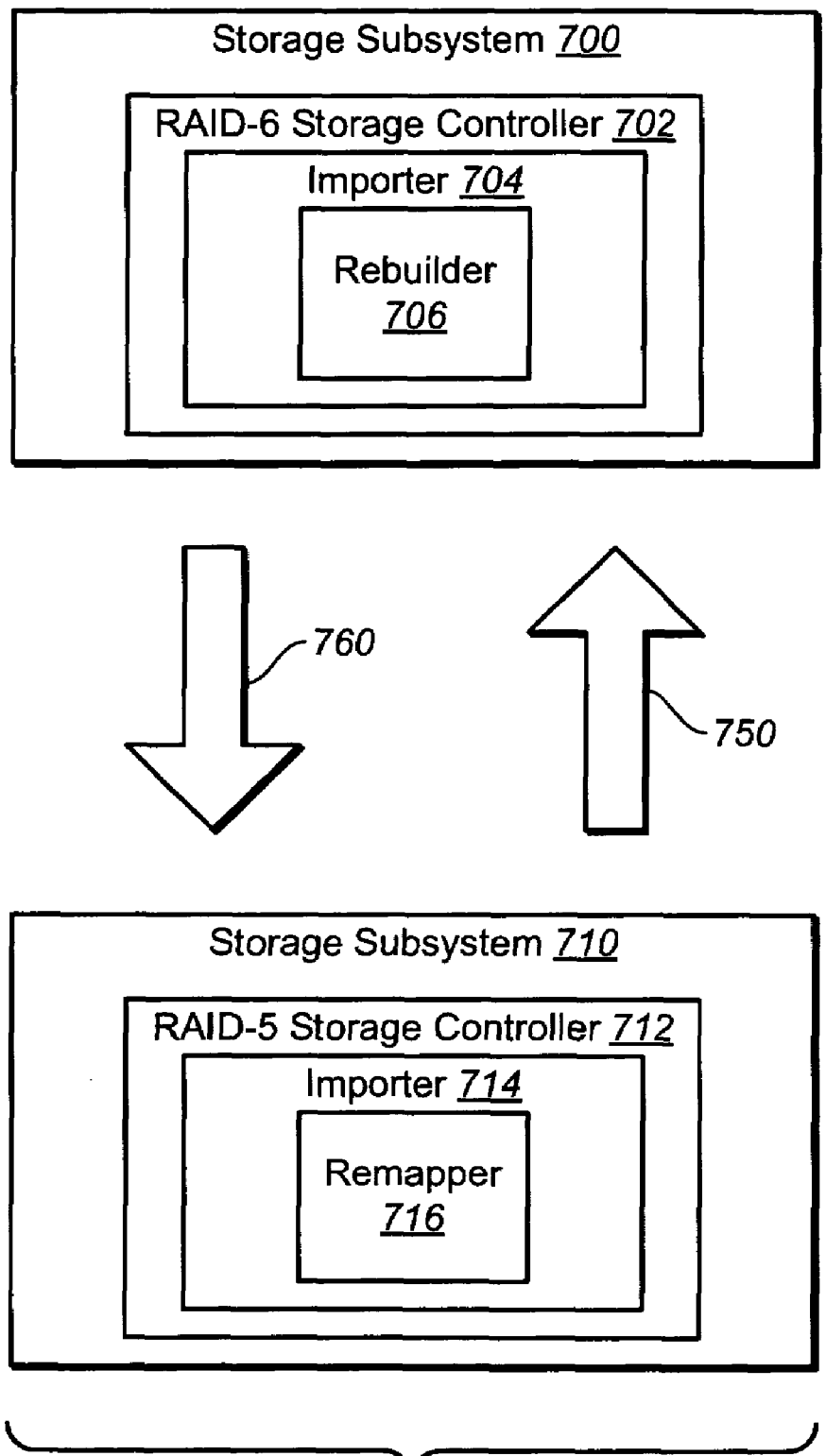
FIG. 7 is a diagram depicting an exemplary system for migrating a RAID level 6 logical volume between a RAID level 6 storage subsystem and a RAID level 5 storage subsystem in accordance with features and aspects hereof.

FIG. 7 is a block diagram showing a system including a first storage subsystem 700 having a RAID-6 storage controller 702. In response to an administrative user's request, RAID-6 storage controller 702 may prepare a logical volume managed thereby for export to another storage subsystem as indicated by arrow 760. The logical volume so prepared for exportation may then be physically removed (e.g., the disk drives or disk drive modules containing that logical volume, and potentially other logical volumes, may be physically removed and inserted into a second storage subsystem).

The system of FIG. 7 also includes a second storage subsystem 710 having a RAID-5 storage controller 712. As noted above, RAID-5 storage controller 712 may be adapted for appropriate RAID-5 storage management but it may be essentially incapable of adequately supporting RAID-6 storage management techniques. Storage controller 712 may include an importer element 714 adapted for importing logical volumes detected on inserted disk drives or disk drives modules. When importer 714 first detects insertion of one or more disk drives associated with imported logical volumes as indicated by arrow 760, importer 714 utilizes re-mapper 716 to re-map the was RAID-6 storage logical volume to be utilized as a RAID-5 logical volume. Storage subsystem 710 may thereby utilize an imported RAID-6 logical volume by managing it as a RAID-5 logical volume. The re-mapped logical volume precludes access to the additional redundancy information blocks recorded on the disk drives by the first storage subsystem using RAID-6 management techniques. However, all other blocks including data and RAID-5 parity blocks are maintained and updated while the imported logical volume is resident within the second storage subsystem 710 utilizing RAID-5 storage management techniques.

Storage subsystem 710 may also prepare the imported logical volume for exportation to be forwarded to yet another storage subsystem (or to be returned to the original first storage subsystem 700 from which it was imported). As indicated by arrow 750, a logical volume managed as a RAID-5 logical volume by the second storage subsystems 710 may be exported to another storage subsystem adapted for effective support of RAID-6 storage management.

A RAID-6 storage subsystem (such as first storage subsystem 700) may import the logical volume exported by second storage subsystem 710. The RAID-5 logical volume may be flagged or tagged to indicate that the second storage subsystem 710 manipulated the logical volume as a RAID-5 logical volume though it was originally configured as a RAID-6 logical volume. Thus, storage subsystem 700 includes a RAID storage controller 702 that includes importer element 704 for importing such a flagged or tagged logical volume. Importer 704 recognizes that the flagged logical volume being imported was originally configured as a RAID-6 logical volume. Rebuilder element 706 then commences rebuilding of the additional redundancy information utilized by RAID-6 storage management techniques. All data and parity associated with RAID-5 management of the logical volume remain valid. Only the additional redundancy information needs to be rebuilt or regenerated by operation of rebuilder 706.

In one aspect hereof, RAID-6 storage controller 702 may continue utilizing the imported logical volume as a RAID-5 logical volume as rebuilder 706 continues its operation to rebuild the additional parity redundancy information required for operation as a RAID-6 logical volume. When rebuilder element 706 has completed the regeneration or rebuilding of the additional redundancy information, RAID-6 storage controller 702 may continue operation of the logical volume utilizing full RAID-6 storage management techniques. Details for coordinating the ongoing utilization of the imported logical volume while rebuilder 706 continues to rebuild the additional redundancy information will be readily apparent to those of ordinary skill in the art. In general, a threshold indicator may be utilized to indicate portions of the logical volume for which rebuilder 706 has completed rebuilding the additional redundancy information. Host system requests directed to an area where the rebuilder has progressed through rebuilding the additional redundancy information may be completed utilizing RAID-6 storage management techniques. Host requests directed to portions of the volume for which the rebuilder 706 has not yet completed rebuilding may be processed in accordance with RAID-5 storage management techniques or may simply be delayed until rebuilder element 706 completes its operation. These and other design choices will be readily apparent to those of ordinary skill in the art.

Figure 8:
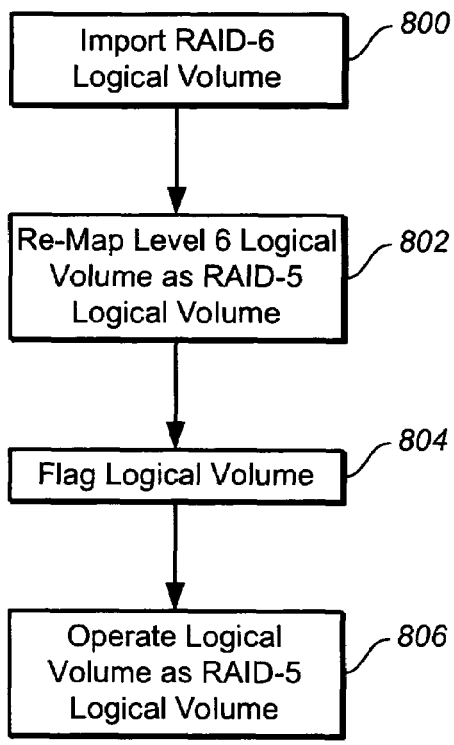
FIGS. 8 and 9 are flowcharts describing processes associated with migrating a RAID level 6 logical volume between a RAID level 6 storage subsystem and a RAID level 5 storage subsystem in accordance with features and aspects hereof.

FIG. 8 is a flowchart describing processing of a storage subsystem adapted to import a RAID-6 logical volume and to operate the imported volume as a RAID-5 logical volume. Element 800 is first operable to detect insertion of a new logical volume through insertion of one or more disk drives associated with the logical volume and to logically import one or more logical volumes associated with the inserted disk drives. In particular, element 800 is operable to detect and import a RAID-6 logical volume for utilization within this RAID-5 storage subsystem. Element 802 is then operable to re-map the logical volume to utilize RAID-5 storage management techniques. As noted above, this re-mapping of the imported RAID-6 logical volume maps all data blocks and RAID-5 parity blocks to corresponding identical blocks of the RAID-6 logical volume. The blocks containing the RAID-6 additional redundancy information are mapped so as to be skipped or unused in the RAID-5 logical volume being defined by the re-mapping process of element 802. Element 804 then flags the re-mapped logical volume to indicate that its RAID-6 additional redundancy information is invalid. Management of the logical volume as a RAID-5 logical volume means, in part, that the RAID-6 additional redundancy information is skipped (inaccessible) and hence not updated by the RAID-5 storage management techniques of this storage subsystem. Element 806 is operable to continue operating the imported logical volume as a RAID-5 logical volume ignoring the skipped blocks containing additional redundancy information. The imported RAID-6 logical volume may thereby be utilized with desired performance in a RAID-5 storage subsystem. By contrast to prior techniques, the imported logical volume is both available for use and utilized with acceptable performance levels.

Figure 9:
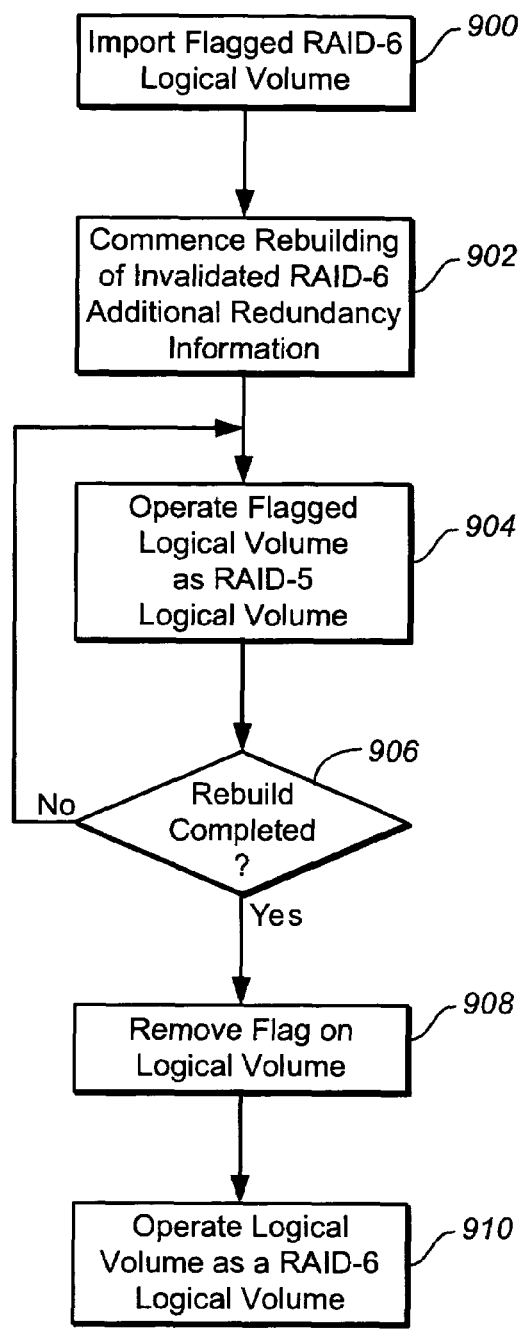

FIG. 9 is a flowchart describing a process in accordance with features and aspects hereof for importing a flagged logical volume into a RAID-6 storage subsystem. As noted above, a RAID-6 logical volume may be utilized in a RAID-5 storage subsystem in such a manner as to be flagged to indicate that the additional redundancy information associated with RAID-6 storage management may be invalid and may therefore require regeneration or rebuilding. Element 900 is therefore operable to detect and import such a flagged RAID-6 logical volume. Element 902 then commences operation of a rebuilding process to rebuild the invalidated RAID-6 additional redundancy information. As noted above, optionally, the imported logical volume may continue to be utilized within the storage subsystem as a RAID-5 logical volume as the rebuilding process continues in parallel. Element 904 therefore represents processing to continue utilizing the imported, flagged logical volume as the rebuilding process proceeds in parallel. Element 906 then determines whether the rebuilding process has completed. If not, processing continues with elements 904 and 906 iteratively performing host I/O requests utilizing the imported logical volume as a RAID-5 logical volume until the rebuild process completes.

Upon completion of the rebuild process, element 908 is operable to remove or reset the flag on the logical volume to indicate that the logical volume is again restored to full RAID-6 operability. In particular, setting and resetting such a flag may be performed by altering the configuration information stored on each disk drive of the logical volume.

Lastly, with the additional redundancy information completely rebuilt or regenerated by operation of element 902 in parallel with ongoing utilization of logical volume, element 910 is operable to continue operations with the logical volume but now utilizing the logical volume as a full RAID-6 logical volume.

Those of ordinary skill in the art will readily recognize a variety of equivalent processes, methods, and techniques for effectively utilizing a RAID-6 logical volume in a storage subsystem essentially incapable of supporting RAID-6 but capable of supporting RAID-5 storage management techniques. The flowcharts of FIGS. 8 and 9 are therefore intended merely as representative of exemplary methods and processes in accordance with features and aspects hereof to permit effective utilization of a RAID-6 logical volume as imported into a RAID-5 storage management system While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method associated with RAID storage subsystems including a first subsystem that includes hardware support for RAID level 6 storage management and including a second subsystem that does not include hardware support for RAID level 6 storage management, the method comprising:
   operating an imported RAID level 6 logical volume in the second storage subsystem as a RAID level 5 logical volume; and
   flagging the imported RAID level 6 logical volume by operation of the second subsystem to indicate that the additional redundancy information associated with the imported RAID level 6 logical volume is invalid.

2. The method of claim 1 further comprising:
   importing the RAID level 6 logical volume into the second storage subsystem prior to the step of operating; and
   exporting the RAID level 6 logical volume from the second storage subsystem following the steps of operating and flagging.

3. The method of claim 2 further comprising:
   importing the RAID level 6 logical volume into the first subsystem; detecting in the first subsystem that the RAID level 6 logical volume has been flagged; and
   re-building the additional redundancy information by operation of the first subsystem; and
   resetting the flagging of the RAID level 6 logical volume within the first subsystem upon completion of the re-building.

4. The method of claim 3 further comprising:
   operating the RAID level 6 logical volume as a RAID level 5 logical volume until completion of the step of re-building.

5. The method of claim 1 wherein the step of operating further comprises:
   mapping a RAID level 5 logical volume on the imported RAID level 6 logical volume such that disk blocks containing the additional redundancy information associated with the RAID level 6 logical volume are skipped and all other disk blocks of the RAID level 5 logical volume map to corresponding disk blocks of the RAID level 6 logical volume.

6. A system comprising:
   a storage subsystem having a storage controller that supports RAID level 5 storage management, the storage controller including:
   an importer for importing a RAID level 6 logical volume for use as a RAID level 5 logical volume,
   wherein the storage controller is adapted to use the imported RAID level 6 logical volume by accessing it as a RAID level 5 logical volume, and
   wherein the storage controller is adapted to flag the logical volume to indicate that the additional redundancy information associated with the imported RAID level 6 logical volume is invalid.

7. The system of claim 6 further comprising:
   a second storage subsystem having a second storage controller that supports RAID level 6 storage management, the second storage controller including:
   a second importer for importing the flagged RAID level 6 logical volume that has invalid additional redundancy information; and
   a rebuilder for rebuilding the invalid additional redundancy information.

8. The system of claim 7 wherein the second storage controller is adapted to process requests to the RAID level 6 logical volume by accessing the RAID level 5 logical volume until the rebuilder has completed rebuilding the invalid additional redundancy information.

9. The system of claim 6 wherein the importer further comprises:
   a re-mapper to map the RAID level 5 logical volume to the RAID level 6 logical volume such that the disk blocks containing the additional redundancy information are skipped and such that all other disk blocks of the RAID level 5 logical volume align with corresponding disk blocks of the RAID level 6 logical volume.

10. A system including:
   a first storage subsystem that includes hardware support for RAID level 6 storage management; and
   a second storage subsystem that does not include hardware support for RAID level 6 storage management,
   wherein the second storage subsystem further comprises:
   means for operating an imported RAID level 6 logical volume as a RAID level 5 logical volume; and
   means for flagging the imported RAID level 6 logical volume to indicate that the additional redundancy information associated with the imported RAID level 6 logical volume is invalid.

11. The system of claim 10 wherein the second storage subsystem further comprises:
   means for importing the RAID level 6 logical volume operable prior to operation of the means for operating; and
   means for exporting the RAID level 6 logical volume from the second storage subsystem following operation of the means for operating and the means for flagging.

12. The system of claim 11 wherein the first storage subsystem further comprises:
   means for importing the RAID level 6 logical volume;
   means for detecting that the RAID level 6 logical volume has been flagged; and
   means for re-building the additional redundancy information; and
   means for resetting the flag of the RAID level 6 logical volume following completion of the re-building.

13. The system of claim 12 wherein the first storage subsystem further comprises:
   means for operating the RAID level 6 logical volume as a RAID level 5 logical volume until completion of the re-building.

14. The system of claim 10 wherein the means for operating further comprises:
   means for mapping a RAID level 5 logical volume on the imported RAID level 6 logical volume such that disk blocks containing the additional redundancy information associated with the RAID level 6 logical volume are skipped and all other disk blocks of the RAID level 5 logical volume map to corresponding disk blocks of the RAID level 6 logical volume.

* * * * *